3,022,260
DECREASING THE VISCOSITY OF BUTYL RUBBER LATEX BY TREATMENT WITH ANION AND CATION EXCHANGE RESINS

Alfred L. Miller, Cranford, Samuel B. Robison, Roselle, and Anthony J. Petro, Elizabeth, N.J., assignors to Esso Research and Engineering Company, a corporation of Delaware
No Drawing. Filed Apr. 21, 1959, Ser. No. 807,766
3 Claims. (Cl. 260—29.7)

This invention relates to improved low viscosity rubber latices of extremely low emulsifier concentration prepared by contacting a latex of high viscosity and containing substantial amounts of emulsifiers with an anion exchange resin and a cation exchange resin. By the process of the present invention, it has been found that the anion exchange resin treatment reduces the viscosity and emulsifier content of the rubber latex and that the simultaneous or subsequent addition of a cation exchange resin surprisingly further reduces the emulsifier content and latex viscosity, although it is known that contacting rubber latices with cation exchange resins per se increases the viscosity of the resulting rubber latex. Also, by the process of the present invention, it has been found that rubber latices of increased solids content may be produced without increasing the viscosity of the latex as compared with the original latex which has not been treated with anion and cation exchange resins. In fact, quite surprisingly, latices having a combination of higher solids content and low viscosity are obtained when practicing the process of the present invention. High solids latices which have relatively low viscosities and contain very low concentrations of emulsifiers are desirable in the coating and impregnation industries. As far as is known, particularly in the butyl rubber latex field, latices having a combination of high solids content, relatively low viscosity and extremely low emulsifier content, which are stable, have never been heretofore available.

Although the present invention relates to rubber latices in general, it is particularly adaptable to butyl rubber latices. A typical butyl rubber latex which is desirably increased in solids content, decreased in viscosity, and lowered in emulsifier concentration by treatment with anion and cation exchange resins, in accordance with the present invention, is prepared from about 100 parts by weight of butyl rubber dissolved to form about a 5 to 35, preferably about a 10 to 30 weight percent solution in a solvent, and dispersed in about 100 to 5,000, preferably about 200 to 3,000 parts by weight of water containing about 1 to 2 phr. (parts by weight per 100 parts by weight of rubber) of an emulsified having the general formula:

$$R(OCH_2CH_2)_nOSO_3M$$

where R is a $C_1$ to $C_{24}$ alkyl, aryl, aralkyl, alkaryl, or cycloalkyl group, $n$ is 0 to 20, preferably about 8 to 18, and M is a divalent or preferably a monovalent metal, and about 0.1 to 5.0 phr., preferably about 0.25 to 2.0 phr. (parts by weight per 100 parts by weight of rubber) of a stabilizing agent which is a monovalent salt of an ortho phosphate such as sodium dihydrogen phosphate, and/or sodium hydrogen sulfate or the like.

Butyl rubber is a copolymer of a $C_4$ to $C_8$ isoolefin with a $C_4$ to $C_{14}$ multiolefin prepared at low temperatures with a dissolved Friedel-Crafts catalyst. The major component of the copolymer is preferably isobutylene, 2-methyl-1-butene, 3-ethyl-1-pentene, etc. The minor component is preferably a multiolefin having from 4 to 10 or 12 carbon atoms. Advantageous multiolefins are butadiene, isoprene, piperylene, dimethallyl, myrcene, allo-ocimene and the like. Of these materials, isoprene is regarded as the most suitable multiolefin. The isoolefin and the multiolefin are mixed in the ratio of a major proportion of isobutylene and a minor proportion of isoprene, the preferred range being 0.5 to 15.0 parts isoprene and 99.5 to 85.0 parts isobutylene. High purity is desirable in both materials and it is preferable to use an isobutylene of at least 99% purity, although satisfactory copolymers can be made of materials of considerably lower purity. The mixture of monomers is cooled to a temperature within the range of between about $-10°$ or $-40°$ C. and $-180°$ C. the preferred range being between about $-60°$ C. and $-110°$ C. The material may be cooled by the use of a refrigerating jacket upon the mixing tank and polymerizer, in which case any refrigerant, such as $C_1$ to $C_3$ alkyl halide, which will yield the desired temperature is satisfactory. Alternatively, the cooling may be obtained by an internal refrigerant which is mixed directly with the olefinic copolymerizate. For this purpose, such materials as liquid propane, solid carbon dioxide, liquid ethane and liquid ethylene are satisfactory. In some instances, liquid methane may be employed, although usually the temperature of boiling liquid methane is undesirably low.

The cold mixture is then polymerized by the addition of a Friedel-Crafts catalyst, preferably in a liquid or dissolved form. Ordinarily an amount of catalyst ranging from about 0.05 to 20%, preferably about 0.15 to about 1.0% of the weight of the mixed olefins is required to polymerize them into a high molecular weight polymer. A partial copolymerization may be obtained by limiting the quantity of catalyst added.

In the polymerization reaction, the liquid catalyst may be sprayed on to the surface of the rapidly stirred, cold olefinic material, or a small high pressured stream of catalyst may be directed into the body of the rapidly stirred mixture. In both processes powerful and efficient stirring is needed to disperse the catalyst into the mixture.

The polymerization proceeds rapidly to a yield of the desired polymer which precipitates out from the solution in the form of a flocculent white solid having many of the physical characteristics of raw gum rubber. When the polymerization has reached the desired stage, the material is conveniently recovered by discharging the whole mixture into warm water which may contain an alcohol, or some other oxygen-containing organic compound, to inactivate the catalyst. The warm water serves the purpose of flashing off the excess refrigerant, the unpolymerized olefins and catalyst solvent. The polymer is then recovered from the water suspension in any conventional manner, such as straining or filtering, or otherwise as may be convenient. The polymer is then dried either as a blanket passing through a tunnel drier or on a mill.

The product is a plastic and elastic material. It generally has a Staudinger molecular weight within the range between about 30,000 and 150,000 or 200,000, the minimum useful molecular weight being about 20,000 and the preferred range between about 40,000 and 80,000. The rubber generally has a Wijs iodine number between about 0.5 or 1.0 and 20, and a maximum iodine number of about 50, the preferred iodine number being about 2 to 15. The rubber materials may contain pigments, reinforcing agents, softeners, vulcanizers or curatives, accelerators, anti-oxidants, or other well-known compounding ingredients.

In order to produce a latex to be treated with an anion and cation exchange resin, in accordance with the present invention, a rubbery copolymer, preferably butyl rubber, is dissolved in a hydrocarbon solvent (to form a solution or cement), advantageously an aliphatic hydrocarbon containing about 4 or 6 or 8 or 10 carbon atoms (e.g., hexane). The hydrocarbon solution formed is then emulsified in the presence of water in which the emulsifying agents have been preferably previously dissolved.

To perform this emulsification, mechanical work must be supplied to break down say the hydrocarbon solution of butyl rubber into particles which are colloidal in size. This mechanical action is aided to a considerable extent by the character of the emulsifier system described above in that it reduces the surface tension between the cement and water phases and in that such emulsifiers afford satisfactory protection from colloidal particles agglomerating with other particles to form larger particles, or coagulum. Machines commonly employed to supply this mechanical action include high speed stirrers such as a Dispersator, high shear producing machines such as colloid mills, high pressure homogenizers and shear producers by sound energy such as the Rapisonic and/or Minisonic Homogenizers, etc.

Typical emulsifiers, which may be used in accordance with the present invention include, among others, organic anionic sulfates preferably containing at least one ethylene oxide unit. For instance, suitable emulsifiers include the sodium salt of sulfated nonylphenoxypolyethoxyethanol, the potassium salt of sulfated nonylphenoxypolyethoxyethanol, the sodium salt of sulfated tridecoxypolyethoxyethanol, the lithium salt or potassium salt of sulfated duodecoxypolyethoxyethanol, ammonium or amine salts of sulfated nonylphenoxy (tridecoxy and/or duodecoxy) polyethoxyethanol, sodium lauryl sulfate, potassium lauryl sulfate, the sodium salt of sulfated octylphenoxy polyethoxyethanol, etc.

The addition of small quantities of an orthophosphate stabilizer salt, that is, about 0.15 or 0.20 to about 2.5 or 3.0 phr., improves the stability of the latex emulsion particularly with respect to the processing stability. The effect of the stabilizing agent is not merely additive, since when used alone, it will not produce a stable emulsion. It is preferred that the stabilizer be used in an amount between about 0.5 and about 2.0 phr., and it is especially desirable to use about 1.0 to 1.5 phr. of the orthophosphate salt.

The emulsion may be prepared, for example, in a Minisonic Homogenizer having a funnel, gear pump, bell, recycle line, rubber cement injection line and a mixer. The funnel may be charged with water containing the emulsifier or emulsifier-stabilizer mixture. The aqueous solution may be recycled by means of a gear pump for about 0.05 to 60, preferably for about 0.1 to 20 minutes. During this operation, the liquid is advantageously pumped through an orifice and sprayed over the edge of a reed in the bell causing it, the reed, to vibrate. It returns to the funnel by means of a recycle line. After about 0.1 to 10 minutes (e.g., 1.0 minute or so) of recycling, the rubber cement, which is generally a hydrocarbon solution containing about 5 to 35% by weight of butyl rubber, may be introduced to the homogenizer through a line which terminates just above the gears of the pump. The coarse emulsion formed in the pump may be then sprayed through an orifice on the edge of a reed and converted to a fine emulsion by the sonic cavitation produced by the vibrating reed. The emulsion may be recycled for about 0.5 to 30 minutes, generally for about 1.0 to 15.0 minutes, before it is withdrawn from the homogenizer and stripped of the hydrocarbon solvent.

The stripping operation may be carried out at elevated temperatures of say about 30° to 50° to about 90° or 95° C. and atmospheric pressures until no more solvent can be removed. If a higher solids latex is desired, vacuum stripping of the water may be employed. Because foaming may occur during this step in a process, the latex is sometimes diluted with stripped or partly stripped latex, or an anti-foaming agent, such as Dow Anti-foam A Emulsion, which is a poly-silicone oil, may be added just prior to and during the solvent removal step.

The amount of water contained in the emulsion is not critical as long as there is enough water present to produce a stable aqueous emulsion. Accordingly, therefore, for shipping purposes, the most desirable form of emulsion is a concentrated emulsion, i.e., an emulsion of high solids content in accordance with the invention. The water may be increased at the time of application by adding whatever water is desired to provide a good working consistency.

In practicing the present invention, 100 parts by weight of a rubber latex, preferably a butyl rubber latex such as described above, are treated at a temperature of about 5° to 90° C., preferably about 10° to 25° C. (room temperature generally being satisfactory) with about 0.2 or 1.0 to 20 or 30 parts by weight or more, advantageously about 2 to 15 parts by weight, and preferably about 3 to 10 parts by weight of an activated anion exchange resin and a similar amount of an activated cation exchange resin either in sequence or simultaneously. The treatment may be accomplished in a number of manners. For instance, the ion exchange resins may be added to the latex and the mixture stirred for a time sufficient for substantially all of the ion exchange to take place, and may subsequently be removed by filtration. Alternatively, the latex may be contacted with the ion exchange resins in a fixed bed by passing the latex through a tower containing the ion exchange resins. Another method resides in the immersion of a confined mass of the ion exchange resins into the latex wherein the resins are enclosed in a wire basket or other perforated containing means of such a structure that the latex may readily permeate within the containing means but the resins do not escape therefrom. By this means, after ion exchange, the resins are removed from the latex simply by removing the container. Obviously other expedients will occur to those skilled in the art, the particular method of contacting the anion and cation exchange resins with the rubber latex not being a critical portion of the present invention.

In order to activate the anion exchange resin, the resin is washed at least one time with sufficient quantities of dilute alkali, such as dilute sodium hydroxide (e.g., 2 to 5% by weight), sodium carbonate, potassium hydroxide, potassium carbonate, mixtures thereof, etc. for a time sufficient to fully activate the anion exchange resin. Normally the amount of dilute alkali material employed will be about 0.1 to 500, preferably about 0.5 to 100 volumes per volume of anion exchange resin, the activation times generally varying from about 0.5 to 200, preferably from about 5 to 100 minutes, at temperatures of between about 5° or 10° C. and about 90° or 95° C. Residual alkali solution and soluble products of activation are removed by excess water washing advantageously until the washings have about the same pH as that of the wash water. Obviously, after use in ion exchange treatment, the anion exchange resin must be reactivated before re-use. This may be conventionally performed by rinsing residual latex from the resin with an excess of water, the anion exchange resin then being ready to be reactivated by contact with dilute alkali solutions followed by washing as described above.

Suitable anion exchange resins useful in this invention include those having a resin structure formed by the copolymerization of styrene and divinylbenzene to which is attached ionizable groups. Such ion exchange resins have the formula

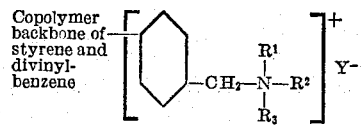

where Y is an anion such as chloride or hydroxyl. These resins are manufactured by The Dow Chemical Company under the trade names of Dowex. Dowex 1 is a resin in which $R^1$, $R^2$, and $R^3$ are methyl groups. Dowex 2 is a resin in which $R^2$ is $CH_2OH$. Dowex 3 is a weakly basic anion exchange resin in which $R^1$, $R^2$, and $R^3$ are hydrogen.

In order to activate the cation exchange resin, the resin is washed at least one time with sufficient quantities of a dilute mineral acid such as dilute sulfuric acid (e.g., 5% by weight) for a time sufficient to fully activate the cation exchange resin. Normally, the amount of dilute acid employed will be about 0.1 to 500, preferably about 0.5 to 100 volumes per volume of cation exchange resin, the activation times generally varying from about 0.5 to 200, preferably about 5.0 to 100 minutes at temperatures of say between about 5° or 10° C. and about 90° or 95° C. Residual acid solution and soluble products of activation are removed by excess water washing until these washings have about the same pH as that of the wash water. Obviously, after use in ion exchange treatment, the cation exchange resin must be reactivated before re-use. This may be conventionally performed by rinsing residual latex from the resin with an excess of water, the cation exchange resin then being ready to be reactivated by contact with dilute acid followed by washing as described above.

This anion exchange resin treated latex was then contacted with 20 grams per 100 grams of latex solids of a cation exchange resin and stirred at room temperature for 30 minutes. The cation exchange resin was separated from the latex by filtration through several layers of cheese cloth at which time the separation was substantially complete. The pH of the recovered now double treated latex was 1.7; the total solids were 51.6%; and the Brookfield viscosity at 6 r.p.m. at room temperature was further decreased from 200 centipoises to 30 centipoises. The viscosity of a totally untreated butyl latex at 51.6% solids is 640 centipoises. Analysis of the emulsifier and stabilizer content by sulfur and phosphorus determination showed that the emulsifier content had been further decreased from 1.70 to 1.25 phr. and the stabilizer content had been reduced from 0.8 to 0.47 phr.

The above data are summarized as follows:

*Table I*

ION EXCHANGE RESIN TREATMENT—BUTYL LATEX

| Treatment | pH | Total Solids, percent | Brookfield Viscosity, cps., 6 r.p.m. | Untreated Viscosity, 6 r.p.m. | Alipal CO-433 phr. | NaH$_2$PO$_4$, phr. |
|---|---|---|---|---|---|---|
| None—control | 5.4 | 55 | 1,370 | 1,370 | 5.3 | 1.07 |
| Anion exchange resin 30 g./100 g. latex solids | 12.1 | 52.3 | 200 | 760 | 1.70 | 0.80 |
| Cation exchange resin 20 g./100 g. latex solids | 1.7 | 51.6 | 30 | 640 | 1.25 | 0.47 |

Suitable cation exchange resins useful in this invention include Permutit Q, a sulfonated polystyrene resin; Zeo-Karb, a sulfonated carbonaceous zeolite made by treating coal, lignite, or wood with oleum, chlorosulfuric acid or other sulfonating agent, washing and screening to size; and Dowex 50 made by the sulfonation of styrene-divinylbenzene resin beads.

In order to more fully illustrate but not to limit the present invention, the following experimental data are given:

EXAMPLE 1

The following method was used to prepare a latex. 100 parts by weight of an isobutylene-isoprene butyl rubber copolymer having a Mooney viscosity at 212° F. for 8 minutes of 75, a mole percent unsaturation of 1.7 and a viscosity average molecular weight of 485,000, dissolved in hexane (20% by weight), were dispersed in 250 cc. of water containing 5.3 phr. (parts per 100 of rubber) of the emulsifier consisting of sodium salt of sulfated nonylphenoxypolyethoxy-ethanol (Alipal CO-433) which contained an average of four ethylene oxide units per molecule and 1.07 phr. of the stabilizer sodium dihydrogen phosphate. This mixture was emulsified in a Rapisonic Homogenizer and was then stripped of hexane at a temperature of 90° C. and atmospheric pressure. Water was subsequently removed by distillation at a temperature of 77° C. and 6 lbs./sq. in. pressure absolute to result in a butyl rubber latex having a total solids content of 55% and a pH of 5.4, the Brookfield viscosity in centipoises at a 6 r.p.m. spindle speed (model LVF) at room temperature being 1370 centipoises.

An activated anion exchange resin was added to the aforementioned butyl latex in a concentration of 30 grams of resin per 100 grams of latex solids and agitated for 30 minutes at room temperature. The resin was removed from the latex by filtration through several layers of cheese cloth at which time the separation was substantially complete. The pH of this treated latex was found to be 12.1, the total solids to be 52.3%, and the Brookfield viscosity at 6 r.p.m. at 70° F. to have decreased from 1370 centipoises to 200 centipoises. At this solids level of 52.3%, the "untreated" latex has a viscosity of 760 centipoises. Analysis for emulsifier and stabilizer by sulfur and phosphorus measurement showed a reduction in emulsifier from 5.3 phr. to 1.7 phr. and reduction in stabilizer from 1.07 to 0.8 phr.

The above data show that the viscosity, emulsifier and stabilizer concentration are all greatly reduced in accordance with the present invention with only a slight decrease in total solids content.

EXAMPLE 2

The same general procedure as in Example 1 was repeated with the same original latex and a comparison was made with regard to mechanical stability properties both before and after double ion exchange resin treatment. The test employed is known as the Hamilton Beach mechanical stability test and employs a Hamilton Beach mixer operated at a speed of 11,700 r.p.m. Both latices were diluted to 25% total solids and were agitated in this mixture for 20 minutes. The resulting latex was filtered through a weighed 40 mesh screen and the recovered polymer determined by dry weight. The results of this test are described in the following table:

*Table II*

|  | Emulsifier | Stabilizer | Dry Coagulum, percent |
|---|---|---|---|
| Untreated latex | 5.3 | 1.07 | 0.5 |
| Double deionized treated latex | 2.1 | 0.4 | 0.7 |

The above data show that the double deionization treatment with ion exchange resins, in accordance with the present invention, produces substantially no change in mechanical stability although the emulsifier and stabilizer concentrations have been advantageously greatly reduced.

EXAMPLE 3

The same general procedure as in Example 1 was repeated with the same original latex and a comparison was made with regard to freeze-thaw stability. This test was performed by holding the samples at 0° F. for 93 hours followed by thawing at 70° F. for 7 hours and then re-freezing the same samples at 0° F. for an additional 48 hours followed by thawing at 70° F. for 7 hours. This represents two extended freeze-thaw cycles. The latices compared were an untreated butyl latex as in Example 2 and a double deionized latex at a pH of 1.8 and thirdly, this same double deionized latex with the pH raised to 5.4 by the addition of concentrated ammonium hydroxide. After each freeze-thaw cycle, the latex was filtered through a 40 mesh screen and the dry weight determined. The results are summarized in Table III.

*Table III*

| | pH | Total Solids, percent | Dry coagulate, percent | |
|---|---|---|---|---|
| | | | 93 hours @ 0° F. | 48 hours @ 0° F. |
| Control | 5.5 | 54.5 | 0.14 | 0.20 |
| Double deionized latex | 1.8 | 50.6 | 0.014 | 0.018 |
| Do | 5.4 | 50.0 | 0.002 | 0.10 |

The above data show that the double deionization treatment improves the resistance of the latex to freezing and thawing, regardless of the final pH.

EXAMPLE 4

The double deionized butyl latex of Example 1 was further treated with 33 grams of the anion exchange resin per 1000 grams of latex solids for 30 minutes in the same manner as Example 1. The resin was separated in the same manner as that described in Example 1. The resulting latex had a pH of 2.2, total solids of 47.5%, and a 6 r.p.m. Brookfield viscosity of 17 centipoises. The untreated latex had a viscosity of 300 centipoises at 47.5% total solids. Analysis of this sample showed only 1.11 phr. of emulsifier and only 0.25 phr. of stabilizer.

The above data show that a double deionized butyl rubber latex (i.e., a butyl rubber latex which has been treated with either an anion exchange resin simultaneously with or followed by a cation exchange resin) which is subjected to an additional treatment with an anion exchange resin raises the pH of the latex and further decreases the emulsifier and stabilizer concentration.

EXAMPLE 5

The pH of the latex resulting from Example 4 was raised arbitrarily to 9.3 with concentrated ammonium hydroxide and was then subjected to vacuum distillation in two stages at 2 p.s.i.a. for about 60 minutes with the following results. The total solids were raised in this manner to 58.5% at which time the pH was 7.2 and the 6 r.p.m. Brookfield viscosity at room temperature was 110 centipoises. The Brookfield viscosity of "untreated" butyl rubber latex at 58.5% total solids is in excess of 2,000 centipoises. In the second stripping stage, the total solids were raised to 65.5% at which time the pH was 7.1, and the Brookfield viscosity at room temperature was 455 centipoises. The Brookfield viscosity of untreated butyl rubber latex at 65.5% total solids is in excess of 5,000 centipoises.

The above data show that the total solids content of butyl rubber latex may be increased from 55% up to 65.5% with a decrease in Brookfield viscosity at 6 r.p.m. at room temperature from 1370 centipoises to 455 centipoises when the latex has had the benefit of the anion-cation resin treatment in accordance with the present invention. In this regard, it is noted that in order to raise the total solids content of butyl rubber latex from 55% to 65.5% without practicing the present invention, the Brookfield viscosity is undesirably but necessarily increased from 1370 centipoises to well in excess of 5,000 centipoises which is an impractical viscosity for use.

Resort may be had to modifications and variations of the disclosed embodiments without departing from the spirit of the invention or the scope of the appended claims.

What is claimed is:

1. A method for decreasing the viscosity of a butyl rubber latex obtained by emulsifying a 5 to 35 wt. percent solution in a $C_4$ to $C_{10}$ hydrocarbon solvent of 100 parts by wt. of a copolymer of a major proportion of a $C_4$ to $C_8$ isoolefin and a $C_4$ to $C_{14}$ diolefin with water containing about 0.15 to about 3.0 parts by wt. of sodium dihydrogen phosphate and an emulsifier selected from the group consisting of the sodium and potassium salts of sulfated nonylphenoxypolyethoxyethanol, the sodium salt of sulfated tridecoxypolyethoxyethanol, the lithium and potassium salts of sulfated duodecoxypolyethoxyethanol, the ammonium and amine salts of sulfated nonylphenoxypolyethoxyethanol, the ammonium and amine salts of sulfated tridecoxypolyethoxyethanol, the ammonium and amine salts of sulfated duodecoxypolyethoxyethanol, sodium lauryl sulfate, potassium lauryl sulfate, and the sodium salt of sulfated octylphenoxypolyethoxyethanol, which comprises contacting the said latex with 0.2 to 30 parts by weight of an alkali-treated anion exchange resin recovering the latex from the anion exchange resin and then contacting it with an acid-treated cationic exchange resin and finally removing the treated latex from the cationic exchange resin.

2. The method of claim 1 in which the latex is contacted first with the anion exchange resin and subsequently with the cation exchange resin.

3. The method of claim 1 in which the latex is contacted simultaneously with both the anion and cation exchange resins.

References Cited in the file of this patent

UNITED STATES PATENTS

| 2,580,325 | Scott et al. | Dec. 25, 1951 |
| 2,799,662 | Ernst et al. | July 16, 1957 |